United States Patent [19]

Ash

[11] Patent Number: 5,297,914
[45] Date of Patent: Mar. 29, 1994

[54] MOBILE RAMP FOR UNLOADING TRUCKS

[76] Inventor: Lloyd Ash, 294 E. 300 South, Pleasant Grove, Utah 84062

[21] Appl. No.: 892,548

[22] Filed: Jun. 1, 1992

[51] Int. Cl.$^5$ .............................................. B65G 67/24
[52] U.S. Cl. .................................... 414/574; 414/376; 414/390; 180/298; 198/313; 198/632
[58] Field of Search .............. 414/354, 355, 356, 362, 414/373, 376, 390, 572, 573, 574; 198/313, 319, 632; 180/294, 298

[56] References Cited

U.S. PATENT DOCUMENTS

| | | | |
|---|---|---|---|
| 510,225 | 12/1893 | Young ........................ | 414/574 X |
| 671,122 | 4/1901 | White .......................... | 414/362 X |
| 1,001,212 | 8/1911 | Moore ......................... | 198/311 X |
| 2,893,502 | 7/1959 | Scheuerpflug ............. | 180/298 |
| 3,378,152 | 4/1968 | Warner ....................... | 414/574 |
| 3,606,050 | 9/1971 | Silver .......................... | 414/574 |
| 3,750,858 | 8/1973 | White .......................... | 198/632 |
| 3,752,335 | 8/1973 | Gomez ........................ | 414/373 X |
| 4,494,903 | 1/1985 | Badicel et al. ............. | 414/574 X |
| 4,813,839 | 3/1989 | Compton ................... | 414/574 X |
| 4,881,691 | 11/1989 | Oldengott et al. ........ | 414/574 X |

FOREIGN PATENT DOCUMENTS 2021527 12/1979 United Kingdom ................ 414/574

*Primary Examiner*—Michael S. Huppert
*Assistant Examiner*—James Keenan
*Attorney, Agent, or Firm*—Thorpe, North & Western

[57] ABSTRACT

An apparatus for unloading belly dump trucks into piles comprises a ramp onto which the unloading truck drives, a hopper for reception of dumped material, and a conveyor running under the hopper and onto a side conveyor arm for disposal of the material The conveyor arm can be raised and lowered and collapsed for transport An engine for powering the apparatus is disposed oppositely of the conveyor arm, and can be moved toward and away from the ramp for transport and operation, respectively. Rear wheel assemblies comprise a plate slidably mounted to the side of the ramp which can raise and lower the ramp. A steerable front wheel assembly can be raised and lowered for removal of the apparatus from the towing truck and local movement of the apparatus.

14 Claims, 6 Drawing Sheets

5,297,914

MOBILE RAMP FOR UNLOADING TRUCKS

FIELD OF THE INVENTION

The present invention concerns the field of apparatuses for unloading trucks, and particularly ramps onto which the truck can be driven for unloading.

BACKGROUND OF THE INVENTION

"Belly dump" trucks, i.e., trucks which empty their load through the bottom or "belly" of the truck, have become popular for hauling various products because of certain advantages that they have over conventional end dump trucks. The contents of a belly dump truck are often more conveniently and efficiently loaded and unloaded and transported. Instead of tipping back the loaded portion of the truck to dump out from its end, the belly dump truck simply opens doors located underneath the bed, i.e., in the "belly" of the truck, allowing its contents to exit through the force of gravity.

In contrast to end dump trucks, belly dump trucks usually dump their contents while moving, leaving a continuous pile or trail of material. End dump trucks dump while stationary, and when the pile reaches such a height that the material will no longer leave the truck, the bed is lowered and the truck is moved to an adjacent location to dump another installment of its contents. This process is repeated until the truck is fully emptied, resulting in a series of large piles of material.

Though belly dump trucks often have clear advantages of efficiency, cost, and time effectiveness, they have a distinct disadvantage when large piles of material are more desirable than trails. For example, in the road construction industry belly dump trucks are frequently used to transport "chip" and related material, chip being the gravel or crushed rock which is placed on the road to strengthen and reinforce the asphalt placed thereon. The road laying machinery requires the chip to be in piles such as result from the discharge of end dump trucks. When belly dump trucks are used to haul the chip, their mode of discharge requires further handling of the chip to get it from a trail into piles. When the chip contacts the ground in a trail, however, it is contaminated with dirt, foreign rock material, and other substances which get mixed in the pile of chip and compromise its purity. This not only lessens the quality of the road, it increases the likelihood that the chip will be rejected upon inspection by the client (usually a state road commission), requiring the contractor to bring in a new load. In gathering the chip into piles, therefore, large amounts of chip must be left on the ground to avoid contamination, increasing expense.

There is needed, therefore, an apparatus for unloading a bottom loader which loads the material into piles ready for subsequent use by other machinery, combining the advantages of an end dump truck and a belly dump truck.

On occasion it is also desirable to empty a truck directly into a railcar or other container, which belly dump trucks are presently unable to do.

Warner, U.S. Pat. No. 3,378,152, describes a truck loader onto which trucks drive and unload their contents, whether they be end or belly dump trucks. It provides for a ramp moved by track machinery onto which the trucks drive, and a hopper in the ramp into which the trucks dump their contents, after which the material is transferred to a conveyor which carries it directly to the road laying machinery. The apparatus is not easily transported from job to job, since the track transport system is necessarily slow. This would require that the apparatus be moved by crane or other means into a tractor-trailer or similar transport device to move the apparatus to a different job site. Even if the apparatus were driven under its own power, its width would constitute a problem on highways.

Other devices of interest in the art include Silver, U.S. Pat. No. 3,606,050, and White, U.S. Pat. No. 671,122.

OBJECTS AND SUMMARY OF THE INVENTION

It is therefore an object of the present invention to overcome the shortcomings of the prior art.

It is a further object of the invention to provide an unloader for trucks which combines the advantages of belly dump and end dump trucks and which is relatively convenient to use and transport from job to job as well as on site.

It is a further object of the invention to provide a truck unloader which can be legally and conveniently driven on developed roads and highways.

In accordance with a first aspect of the invention, an apparatus for receiving and handling material unloaded from a dump truck and adapted for convenient transportation comprises an elongate ramp having first and second end portions and a middle portion, the height of the ramp gradually increasing from the first end portion to the middle portion and gradually decreasing from the middle portion to the second end portion, the ramp being adapted to receive the dump truck driving thereon, receiving means for receiving material from the dump truck and conveying it to a location adjacent the apparatus, a wheel operatively mounted to the ramp to enable transportation of the apparatus, and raising means for selectively raising the ramp relative to the wheel for transport and lowering the ramp relative to the wheel for receiving unloaded material.

In accordance with a second aspect of the invention, an apparatus for receiving material unloaded from a dump truck which can be easily transported comprises an elongate ramp having first and second lateral sides, receiving means in the ramp for receiving the material, a conveyor arm attached to the first side of the ramp and adapted to receive the material from the receiving means, said conveyor arm extending laterally from the ramp while receiving material, collapsing means for collapsing the conveyor arm over the ramp to reduce the width of the apparatus during transport, a motor attached to the second side of the ramp, moving means for selectively moving the motor toward the ramp for transport and away from the ramp for operation, and means for attaching the apparatus to a prime mover for transport.

Specifically, and in a preferred embodiment, a mobile ramp apparatus for unloading trucks comprises first and second substantially parallel elongate wheel ramps each having first and second end portions and a middle portion, the middle portion being of greater height than the end portions, the ramps being adapted for reception of trucks driving thereon for unloading material, the wheel ramps being connected together by a plurality of cross members, a hopper disposed between the wheel ramps for reception of unloaded material, a conveyor arm attached to the side of the second wheel ramp, the conveyor arm being adapted to extend laterally from the second wheel ramp during unloading and fold upon itself during transport of the apparatus, a looped conveyor belt disposed underneath the hopper and on the conveyor arm for receiving material from the hopper and carrying it to the end of the conveyor arm, means for driving the conveyor belt, an engine attached to the side of the first wheel ramp oppositely from the conveyor arm, the engine being adapted to move toward the first wheel ramp for transport and away from the first wheel ramp for operation, first and second plates slidably and vertically attached to the second end portions of the first and second wheel ramps, respectively, first and second wheels rotatably attached to the first and second plates, respectively, means for sliding the first and second plates relative to the wheel ramps, a front drive wheel assembly mounted between the first end portions of the wheel ramps, means for selectively retracting the front drive wheel assembly from between the wheel ramps and extending it under the wheel ramps, and means for hitching the apparatus to a prime mover.

BRIEF DESCRIPTION OF THE DRAWINGS

These and other objects, aspects, and embodiments of the present invention will be described with reference to the following drawing figures, of which.

DETAILED DESCRIPTION OF THE INVENTION

Figure 1:
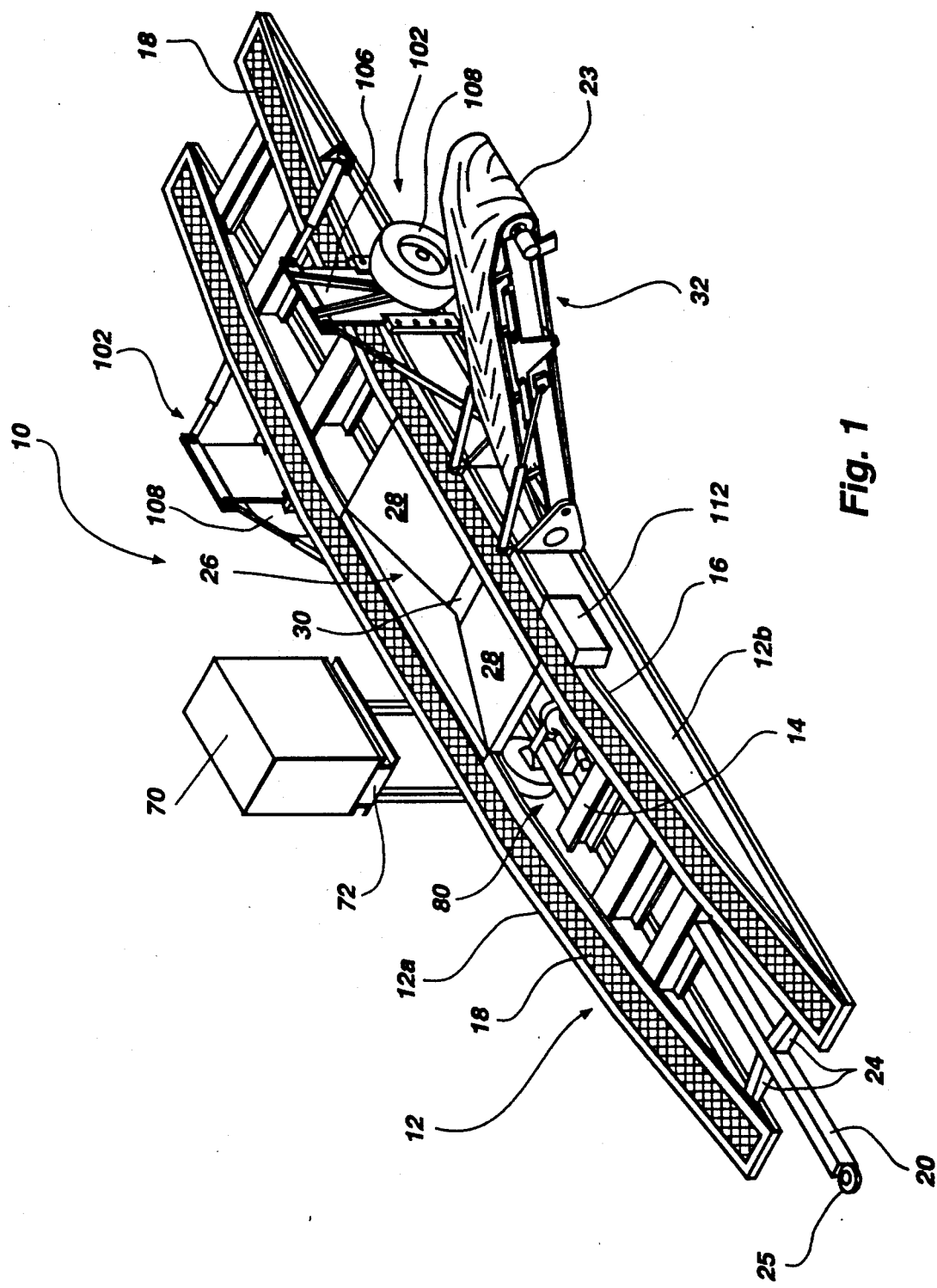
FIG. 1 is a perspective view of an example of a mobile truck unloading apparatus according to the invention.

Referring first to FIGS. 1 through 6, an example of a mobile apparatus 10 for unloading trucks according to the invention is shown. The apparatus 10 includes a ramp 12 onto which a truck 13, shown in phantom in FIG. 5, drives to unload, and which comprises two parallel wheel ramps 12a and 12b which are spaced from one another and rigidly attached together by a plurality of structural cross beams 14 spanning the space between them. The ramps 12a,b are elongated and raised in height in their middle sections to a height of approximately 24 inches in the preferred embodiment, gradually decreasing in height toward their ends. Thus, the truck 13 can easily drive onto the ends of the ramps 12a,b and be raised above the ground at the middle sections of the ramps for unloading. After unloading, the truck can drive down the ramps over the opposite ends of the ramps onto the ground. The apparatus is then ready for another truck to unload.

The preferred height of the middle sections of the ramps is low enough so that truck 13 driving onto it does not high-center when in position, but high enough to accommodate the necessary machinery in the apparatus for unloading the truck. It has been found that a maximum height of 24 inches is satisfactory. The preferred embodiment of the apparatus 10 is designed to accommodate belly dump trucks for the reasons set forth above, but the truck 13 can also be an end dump truck, if desired.

Figure 2:
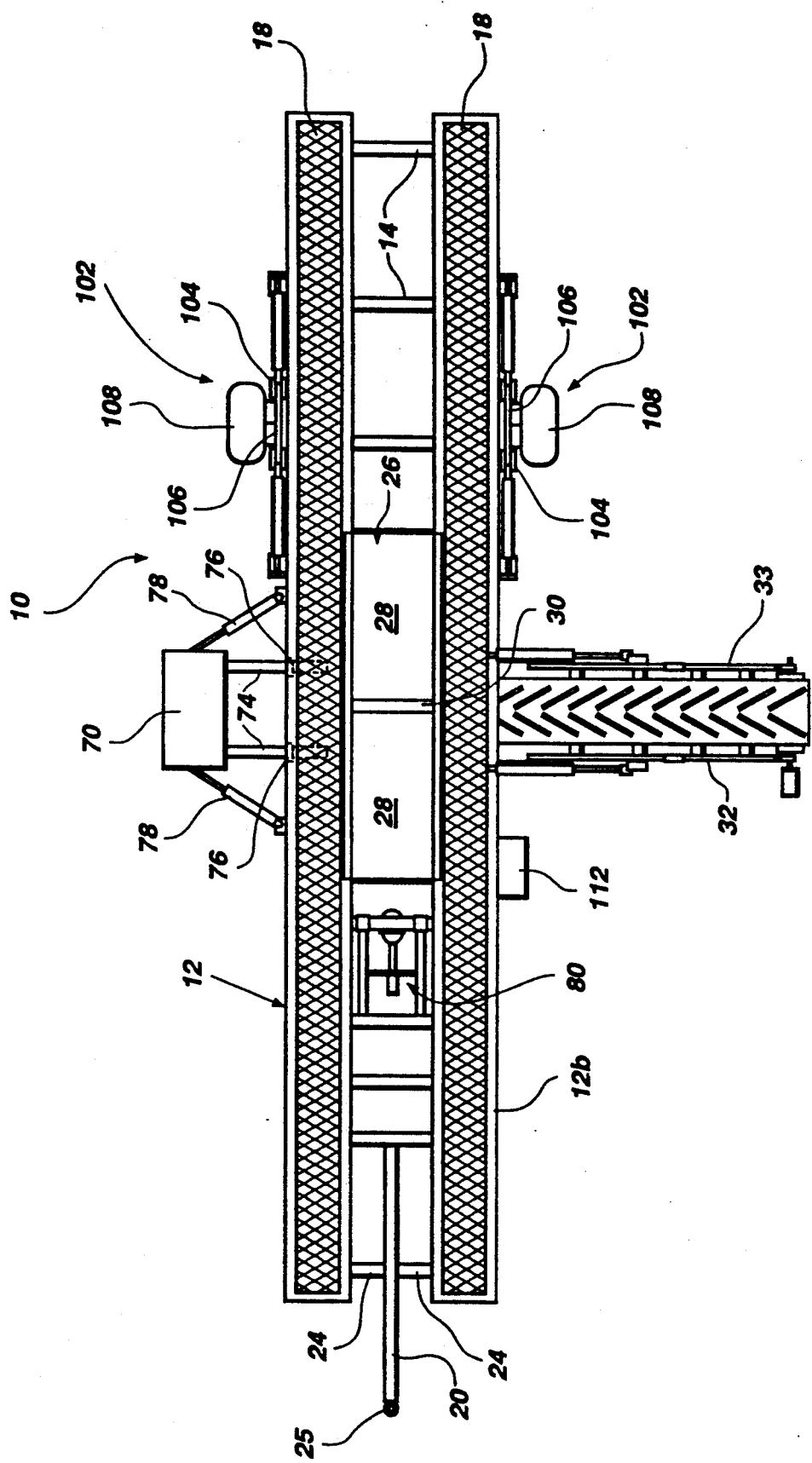
FIG. 2 is top plan view of the apparatus of FIG. 1.

Each ramp 12a and 12b is preferably constructed of side I-beams 16 and a top runway 18 (FIGS. 1 and 2). The runway 18 is preferably constructed of a steel mesh or grating which is configured to allow for maximum traction and strength when the truck is on the apparatus 10, as is well-known in the art. The components of the ramp 12, including the cross beams 14, are all preferably constructed of steel and welded together, although other suitably strong materials as well as methods of attachment can alternatively be used.

Figure 3:
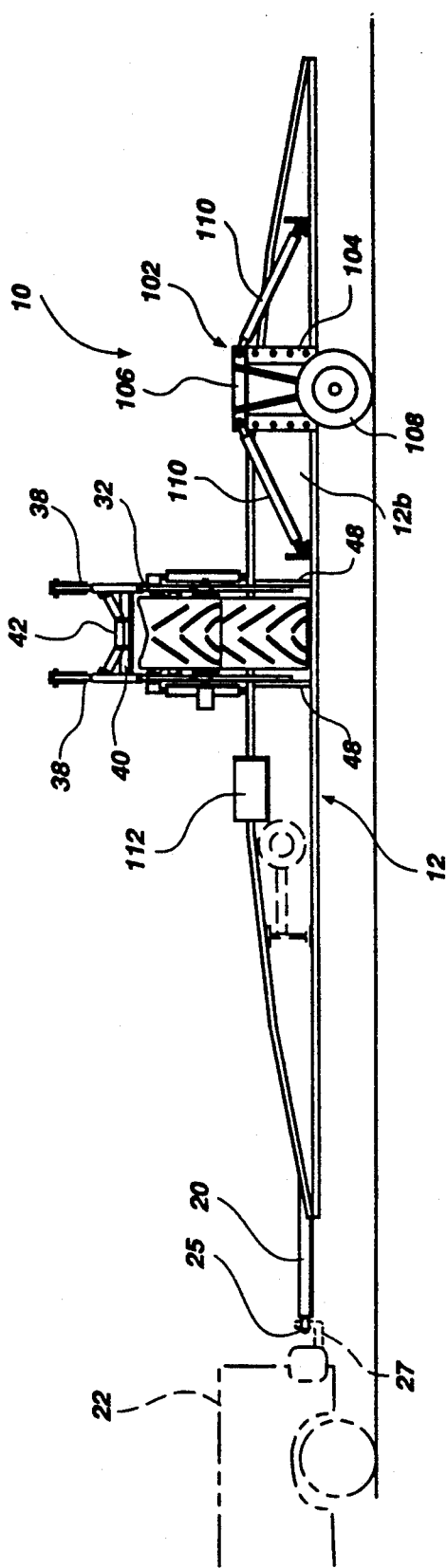
FIG. 3 is a side elevational view of the apparatus of FIG. 1 while in condition to be towed for transport.
Figure 4:
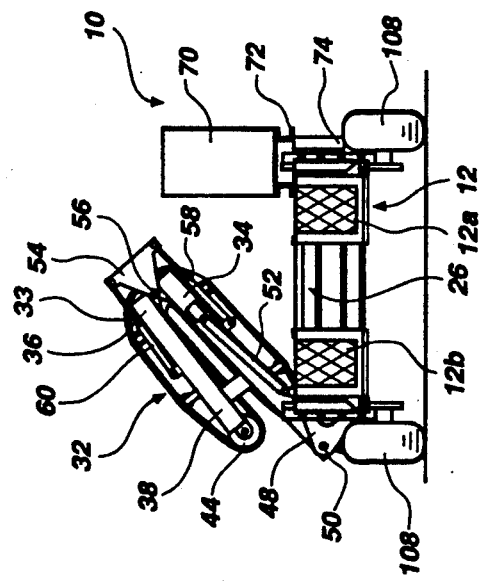
FIG. 4 is a rear elevational view of the apparatus of FIG. 1 while in condition to be towed for transport.
Figure 5:
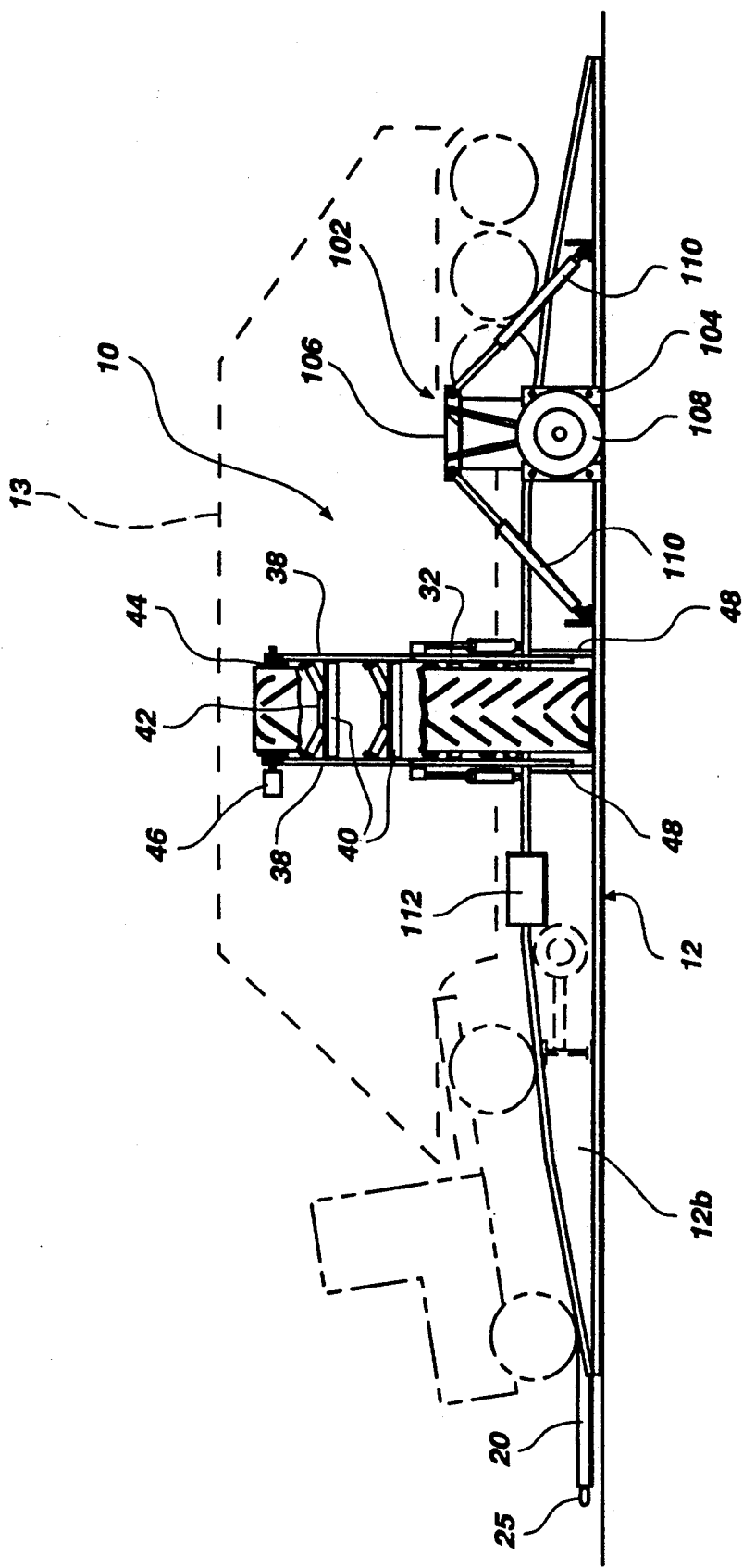
FIG. 5 is a side elevational view of the apparatus of FIG. 1 while in use.
Figure 6:
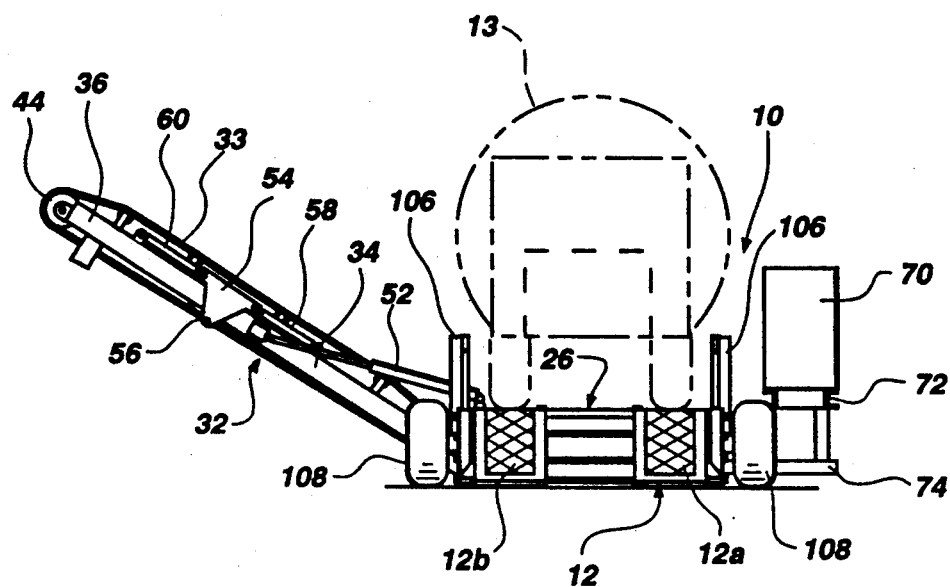
FIG. 6 is a rear elevational view of the apparatus of FIG. 1 while in use.

The bottoms of the ramps 12a,b are preferably flat in order to be able to lie in a stable position on the ground when the apparatus 10 is in operation, as is shown by FIGS. 5 and 6. When the apparatus 10 is in operation, the ramps are located on the ground in order to allow unloading trucks to drive onto and off of them. When the apparatus is being transported, however, either under its own power or under that of another vehicle, the ramps 12a,b are lifted off of the ground as shown in FIGS. 3 and 4 and as further discussed below. The ramps are lifted approximately two feet in the preferred embodiment, but this height can easily be modified subject to road conditions and the particular needs of the user.

It will be appreciated that the lifted position of the ramps enables the apparatus 10 to be road worthy, eliminating the problem of the ramp scraping or bumping against the road as it is transported. In contrast, the dropped operational position of the ramp enables trucks to easily drive upon it during unloading. Thus, the present invention provides for an unloading apparatus which is easily operable as well as transportable, a notable advantage over the prior art.

An elongate hitch tongue 20 attaches to and extends forwardly of the forwardmost cross beam 14 beyond the forward end of the ramp 12 for attachment to a truck 22, shown in phantom in FIG. 3, or other pulling vehicle, when the apparatus 10 is transported. Reinforcing beams 24 extend from the sides of the hitch tongue 20 to the interior sides of the ramps 12a,b for additional strength. The hitch tongue 20 contains at its front end a ring 25 or other suitable hitch member for attachment onto the truck 22, and the truck correspondingly contains a rod hitch 27 or other conventional hitch for locking engagement with the ring 25. The tongue 20 and reinforcing beams 24 are preferably welded to each other and to the rest of the ramp 12. The tongue 20 and beams 24 are preferably made of strong rigid steel of the same type of which the rest of the ramp 12 is constructed.

A hopper 26 is disposed in the middle section of the ramp 12 between the ramps 12a,b and is adapted for reception of the material unloaded into the apparatus 10 by the truck 13. The hopper 26 comprises sloped plates 28 mounted at their side edges on the interior sides of the ramps 12a,b and which slope downward toward the center of the ramp 12. The bottom edges of the plates 28 ar spaced from each other forming a trough 30 between the bottom edges of the plates, under which is disposed a conveyor for further processing of the material. The plates 28 of the hopper are made of standard sheet metal in the preferred embodiment, and can be welded onto the ramps 12a,b. Alternatively, the hopper can be formed independently of the ramp 12 and placed thereon by any suitable means, as will be apparent to those skilled in the art. The hopper 26 can be made as large or as small as desired according to the needs of the user, the size and nature of the truck 13, and the material used with the apparatus 10. The slope of the plates 28 can also be varied according to the particular needs of the user and the material unloaded.

A conveyor arm 32 is mounted on the side of the ramp 12b. The conveyor arm 32 is extendable and collapsible in the preferred embodiment such that it can be extended in the operational position, FIGS. 5 and 6, or collapsed onto the ramp 12b during transport in order to reduce the width of the apparatus 10 on the highway, FIGS. 3 and 4. The collapsed position of the conveyor arm 32 also lends stability to the apparatus 10 during transport. During operation, in the extended position, the conveyor arm 32, together with a conveyor belt 33 mounted on the arm 32, removes the material dumped into the hopper 26 by the truck 13 and transports it to piles of material formed to the side of the apparatus 10.

Referring particularly to FIGS. 3-6, the conveyor arm 32 is constructed of a proximal section length 34 which is pivotally attached to the side of the ramp 12b such that the conveyor arm is able to be raised or lowered during operation. The amount of raising or lowering of the arm through pivotal attachment of the proximal section 34 to the ramp 12b depends on the distance which the material being unloaded is desired to be placed from the ramp 12 and the height of the pile desired. For example, if small piles located relatively far from the apparatus are desired, the arm 32 will be oriented more nearly parallel to the ground. If larger piles nearer the apparatus are desired, the arm 32 will be raised, causing its angle with the ground to be larger.

A distal section length 36 is pivotally attached to the proximal section 34 such that the conveyor arm can be collapsed upon itself for transport. Each section 34 and 36 of the arm is constructed of rigid side beams 38 which are parallel and spaced from each other, and a plurality of cross beams 40 spanning the distance between the side beams 38. A plurality of rollers 42 are mounted on the beams 38 and 40 in order to facilitate movement of the conveyor belt 33. A drive roller 44 is mounted at the end of the distal section 36, and a hydraulic motor 46 is mounted axially to the drive roller 44 for driving the movement of the conveyor belt. Means for driving the conveyor belt other than hydraulics can also be used, if desired, as will be appreciated by those skilled in the art. More than one drive roller can be used, and its location can be varied.

The proximal section 34 of the conveyor arm is mounted to the ramp 12b by two attachment extensions 48 which are welded or otherwise secured to the side of the ramp 12b. Each side beam 38 is attached by a rod 50 or other pivotal attachment means to these extensions 48 (FIG. 4). Hydraulic rams 52 are mounted at one end to the ramp 12b above the attachment extension 48 and at the other to the side beam 38, on each side of the proximal section 34, to alternately raise the proximal section up and over the ramp 12b for transport, FIGS. 3 and 4, and lower the proximal section to the desired angle for operation, FIGS. 5 and 6.

Two triangular side plates 54 are mounted between the proximal and distal sections 34 and 36 for structural support and to enable the movement of the sections relative to each other. The side plates 54 are pivotally attached at their apices 56 to the sections 34 and 36 at their adjacent ends and in the operational position, FIGS. 5 and 6, on the underside of the side beams 38. The side plates 54 are of approximately the same width as the side beams 38, thereby becoming essentially a part of the side beams in the operational position.

A hydraulic ram 58 is attached at one end to a corner of each triangular side plate 54 adjacent the proximal section of the conveyor arm 32 and at the other end to a side beam of the proximal section 34. Hydraulic rams 60 are similarly but oppositely attached to the side plates 54 from the distal section 36. To collapse the conveyor arm 32, the rams 58 and 60 are extended, pushing the side plates away from the sections 34 and 36 and causing them to fold upon each other, as seen in FIGS. 3 and 4. To extend the conveyor arm 32, the rams are compressed causing each section to draw near to the side plates 54 and extend the arm, as seen in FIGS. 5 and 6.

Figure 7:
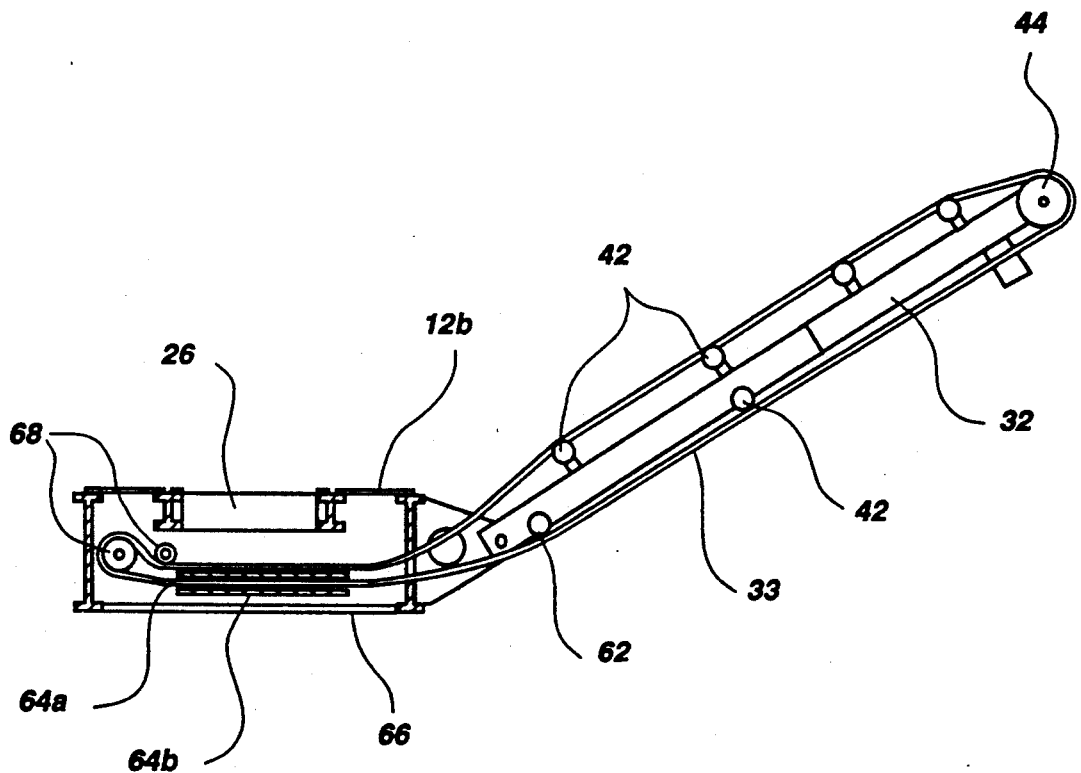
FIG. 7 is a front elevational view in cross-section of the apparatus of FIG. 1, showing the conveyor belt.

Referring now additionally to FIG. 7, the conveyor belt 33 runs on rollers 42 on the conveyor arm 32 and is driven by the drive roller 44. At the end of the conveyor arm 32 adjacent the ramp 12, the lower portion of the conveyor belt extends into the ramp 12 underneath the ramp 12b, guided by a roller 62. From there it runs underneath the hopper 26 between flat plates of rigid and slick plastic 64a and 64b, which are mounted in any suitable fashion in the ramp 12. The plastic plates 64a,b are provided to minimize friction between the belt 33 and other components of the apparatus 10 a as between the upper and lower portions of the belt itself. A protective steel pan 66 is provided under the plate 64b for protection from impact during transport or operation.

The conveyor belt 33 then travels over and between rollers 68 disposed oppositely from the conveyor arm 32 in the ramp 12a, and then directly underneath the hopper 26 over the plate 64a to receive the material in the hopper 26 through the trough 30. The belt, now carrying the material, then travels through the ramp 12b and up the conveyor arm 32 until reaching the drive roller 44, at which time the material is thrown from the belt onto a pile. As will be apparent from those skilled in the art the height of the conveyor arm 32 and the speed of the conveyor belt 33 will influence the manner of discharge of the material.

Referring again to FIGS. 1-6, an engine or motor 70 is mounted to the ramp 12a directly opposite the conveyor arm 32 to counteract the weight of the conveyor arm and thereby balance the apparatus 10. The engine 70 powers all the hydraulic devices on the apparatus 10 through suitable tubing and connections, as is known in the art. The engine 70 rests on a frame 72 made of suitably strong and rigid steel members which are shaped in a sideways U as viewed from behind, as in FIGS. 4 and 6, which fits onto the ramp 12a in the transport position. The lower portion of the frame 72 is constructed of two steel beams 74 which fit snugly into holes 76 disposed in the side of the ramp 12a. The beams 74 are slidably mounted in the holes 76 such that the frame 72 upon which the engine 70 is mounted can move toward and over the ramp 12a in the transport position, FIGS. 3 and 4, and away from the ramp 12a in the operational position, FIGS. 5 and 6. Hydraulic rams 78 are diagonally mounted at one end on each beam 74 and at the other to the side of the ramp 12a to slide the beams 74 in and out of the holes 76 (FIG. 2).

In the transport position, FIGS. 3 and 4, the engine 70 is disposed directly over the ramp 12a. This decreases the width of the apparatus 10 for transit. In the operational position, FIGS. 5 and 6, the engine 70 is moved away from the ramp 12a in order to clear the runway 18 for the unloading truck 13 and to counterbalance the apparatus 10 when the conveyor arm 32 is extended. In the preferred embodiment, the total width of the apparatus 10 when the engine 70 is placed over the ramp 12a and the conveyor arm 32 is collapsed over the ramp 12b is 14 feet. This width enables the apparatus to be towed on a road without extra leading and trailing warning vehicles, which are required by many states for very wide loads.

The engine 70 is preferably a standard diesel engine configured to power the hydraulic system of the apparatus 10, in a conventional manner.

Figure 8:
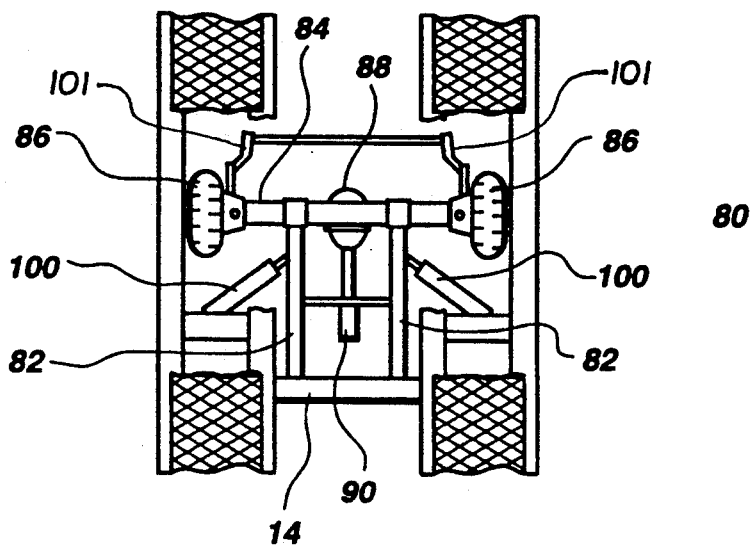
FIG. 8 is a partial top plan view showing the front wheel assembly.

Referring particularly to FIG. 8, a front wheel assembly 80 is pivotally attached to a front cross beam 14 in the ramp 12, and can be selectively raised and lowered as needed. The assembly 80 comprises in the preferred embodiment two beams 82 which are pivotally attached at one end to the cross beam 14 and an axle 84 which is mounted to the opposite end of the beams 82. Wheels 86 are mounted on the ends of the axle 84 and a differential 88 is mounted at the center of the axle 84. A hydraulic motor 90 is mounted to the differential 88 for powering the differential 8 and wheels 86.

A hydraulic ram 100 is attached at one end to each beam 82 and at the other end to the ramp 12 to raise and lower the wheels 86 through the pivotal attachment of the beams 82 to the cross beam 14. In the preferred embodiment, the wheels 86 can be steered by conventional steering mechanisms 101.

Figure 9:
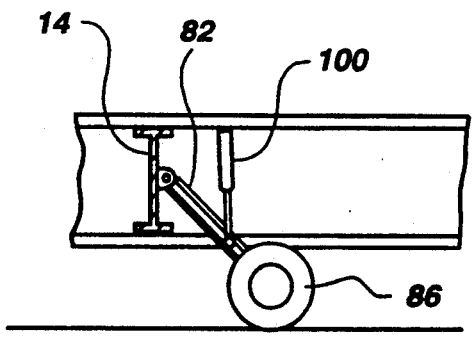
FIG. 9 is a partial side elevational view showing the front wheel assembly.

The front wheel assembly 80 provides the apparatus 10 with numerous advantages. After transporting the apparatus 10 to the job site, the apparatus can easily be unhitched from the pulling truck 22 by lowering the wheels 86 onto the ground, as shown in FIG. 9, and pushing the ramp 12 up, unhitching the ring 25 and rod hitch 27. In the lowered position, the front wheel assembly 80 also provides for self-powered movement of the apparatus 10 when not attached to the pulling truck if further movement of the apparatus is needed at the job site. Additionally, the wheels 86 can be steered to maneuver the apparatus to the correct position. After the apparatus 10 is unhitched and correctly positioned, the wheels 86 are again raised to allow the ramp 12 to be lowered to the ground for operation.

Referring again to FIGS. 1-6, rear wheel assemblies 102 are provided toward the rear of the apparatus 10. Each assembly 102 comprises a bracket 104 mounted on one of the wheel ramps 12a or 12b which is adapted for sliding reception of a rigid vertical plate 106. A wheel 108 is rotatably attached to the bottom portion of the plate 106. A hydraulic ram 110 (FIGS. 3 and 5) is attached to each side of the top portion of the plate at one end and to the ramp 12 at the other end to slidingly raise and lower the plate in the bracket 104 as desired.

As can be seen in FIGS. 3 and 4, in the transport position the plate 106 is lowered relative to the bracket 104, causing the ramp 12 to be raised above the wheels 108 for transport of the apparatus. In the operational position, FIGS. 5 and 6, the plate 106 is raised relative to the bracket 104, causing the ramp 12 to be lowered onto the ground for operation. If desired, the wheels 108 may be raised off the ground slightly to ensure that the ramp is solidly placed thereon.

A control panel 112 is mounted at the side of the ramp 12b near the conveyor arm 32 for user operation of the various mechanisms included in the apparatus. Suitable connections from the control panel 112 to the engine 70 and other components will be apparent to those skilled in the art.

The invention thus comprises a truck unloading apparatus which can be made compact and raised for convenient transport, and then expanded and lowered for operation. It can be locally moved under its own power as well as be towed from job to job.

It will be appreciated that the embodiment described herein is only one example of the invention, and that modifications and variations of the invention will be apparent to those skilled in the art in light of this disclosure while remaining within the scope of the invention.

I claim:

1. Apparatus for receiving and handling material unloaded from a dump truck and adapted for convenient transportation comprising:
   an elongate ramp adapted to receive the dump truck driving thereon, the ramp further including
      a stationary top surface substantially defined by a continuously rigid and integral structural member such that no substantial portion of said top surface can move relative to another portion thereof, said top surface defining a continuous drive path and having first and second end portions and a middle portion, the height of said top surface gradually increasing from the first end portion to the middle portion and gradually decreasing from the middle portion to the second end portion;
   receiving means disposed in the ramp for receiving material from the dump truck and conveying it to a location adjacent the apparatus;
   a wheel operatively mounted to the ramp to enable roadworthy transportation of the apparatus in the same direction as the drive path of the ramp; and
   raising means for selectively raising the entire apparatus relative to the wheel for transport and lowering the entire apparatus relative to the wheel for receiving unloaded material.

2. The apparatus of claim 1 wherein the wheel is rotatably attached to the lower portion of a vertical plate having upper and lower portions, and wherein the plate is vertically slidably mounted on the ramp, and wherein the raising means raise and lower the plate relative to the ramp.

3. The apparatus of claim 2 wherein the raising means comprises an elongate hydraulic ram attached at a first end to the ramp and at a second end to the upper portion of the plate.

4. The apparatus of claim 3 wherein the first end of the ram is located lower than the second end of the ram, whereby when the ram is extended the plate is raised relative to the ramp and when the ram is retracted the plate is lowered relative to the ramp.

5. The apparatus of claim 1 wherein the wheel is mounted to the ramp at the second end portion thereof, and further comprising a second wheel mounted to the ramp at the first end portion thereof, means for selectively raising and lowering the second wheel, and means for driving the second wheel such that the apparatus is capable of moving under its own power.

6. The apparatus of claim 5 further comprising means for steering the second wheel.

7. The apparatus of claim 1 wherein the ramp comprises two parallel wheel ramps and further comprising two rods having first ends and second ends, the rods pivotally mounted at the first ends between the two wheel ramps at the first end portion thereof, an axle having ends, the axle laterally attached to the second ends of the rods, first and second driving wheels attached to each end of the axle, means for driving the first and second driving wheels, and means for pivoting the rods relative to the ramp such that the driving wheels are alternately retracted between the wheel ramps and extended below the wheel ramps.

8. The apparatus of claim 1 wherein the receiving means comprises a hopper disposed in the ramp and a conveyor disposed adjacent the hopper.

9. The apparatus of claim 1 further comprising a conveyor arm attached to a first side of and adapted to extend laterally from the ramp in an operational position and collapse upon itself in a transport position, and an engine adjacently attached to a second side of the ramp oppositely from the conveyor arm and adapted to be vertically slidably spaced from the ramp by a first distance in the operational position and by a second distance smaller than the first in the transport position.

10. Apparatus for receiving material unloaded from a dump truck which can be easily transported comprising:
   an elongate ramp having first and second lateral sides;
   receiving means in the ramp for receiving the material;
   a conveyor arm attached to the first side of the ramp and adapted to receive the material from the receiving means, said conveyor arm extending laterally from the ramp while receiving material;
   collapsing means for collapsing the conveyor arm over the ramp to reduce the width of the apparatus during transport;
   a motor attached to the second side of the ramp;
   moving means for selectively moving the motor toward the ramp for transport and away from the ramp for operation;
   means for attaching the apparatus to a prime mover for transport;
   an attachment extension protruding laterally from the first side of the ramp, and wherein the conveyor arm comprises an elongate proximal section pivotally attached at a first end to the attachment extension, a triangular intermediate section pivotally attached at a first corner to a second end of the proximal section, and an elongate distal section pivotally attached at a first end to the first corner of the intermediate section, and wherein the collapsing means comprises a first elongate hydraulic ram attached at a first end to the ramp and at a second end to the proximal section, a second elongate hydraulic ram attached at a first end to the proximal section and at a second end to a second corner of the intermediate section, and a third elongate hydraulic ram attached at a first end to the distal section and at a second end to a third corner of the intermediate section, whereby when the first ram is retracted and the second and third rams are extended, the proximal section moves over the ramp and the distal section moves near the proximal section.

11. Mobile ramp apparatus for unloading trucks comprising:
   first and second substantially parallel elongate wheel ramps each having first and second end portions and a middle portion, the middle portion being of greater height than the end portions, the ramps being adapted for reception of trucks driving thereon for unloading material, the wheel ramps being connected together by a plurality of cross members;
   a hopper disposed between the wheel ramps for reception of unloaded material;
   a conveyor arm attached to a side of the second wheel ramp, the conveyor arm being adapted to extend laterally from the second wheel ramp during unloading and fold upon itself during transport of the apparatus;
   a looped conveyor belt disposed underneath the hopper and on the conveyor arm for receiving material from the hopper and carrying it to an end of the conveyor arm;
   means for driving the conveyor belt;
   an engine attached to a side of the first wheel ramp opposite from the conveyor arm, the engine being adapted to move toward the first wheel ramp for transport and away from the first wheel ramp for operation;
   first and second plates slidably and vertically attached to the second end portions of the first and second wheel ramps respectively;
   first and second wheels rotatably attached to the first and second plates, respectively;
   means for sliding the first and second plates relative to the wheel ramps;
   a front drive wheel assembly mounted between the first end portions of the wheel ramps;
   means for selectively retracting the front drive wheel assembly between the wheel ramps and extending it under the wheel ramps;
   means for hitching the apparatus to a prime mover.

12. The apparatus of claim 11 wherein the middle portion of the wheel ramps is approximately 24 inches in height.

13. The apparatus of claim 11 wherein when the engine is moved toward the first wheel ramp and the conveyor arm is folded upon itself the apparatus is approximately 14 feet in width.

14. The apparatus of claim 11 further comprising a roller disposed in the first wheel ramp over which the conveyor belt is situated, a first friction-reducing plate disposed beneath the upper portion of the conveyor belt under the hopper, and a second friction-reducing plate disposed beneath the lower portion of the conveyor belt under the hopper.

* * * * *